United States Patent
McKenna et al.

(10) Patent No.: US 9,731,553 B2
(45) Date of Patent: Aug. 15, 2017

(54) PNEUMATICALLY-OPERATED RIGID LINEAR CHAIN AND SPROCKET ACTUATOR FOR DEPLOYING A VEHICLE SNOW CHAIN TRACTION SYSTEM

(71) Applicants: Shane Evan McKenna, Draper, UT (US); John Horace Atkinson, Jr., Orem, UT (US)

(72) Inventors: Shane Evan McKenna, Draper, UT (US); John Horace Atkinson, Jr., Orem, UT (US)

( * ) Notice: Subject to any disclaimer, the term of this patent is extended or adjusted under 35 U.S.C. 154(b) by 624 days.

(21) Appl. No.: 14/073,847

(22) Filed: Nov. 6, 2013

(65) Prior Publication Data

US 2014/0338808 A1    Nov. 20, 2014

Related U.S. Application Data (60) Provisional application No. 61/723,256, filed on Nov. 6, 2012.

(51) Int. Cl.
*B60C 27/14*    (2006.01)
*B60B 39/00*    (2006.01)

(52) U.S. Cl.
CPC ............ *B60B 39/006* (2013.01); *B60C 27/14* (2013.01); *B60B 2900/551* (2013.01); *B60B 2900/721* (2013.01)

(58) Field of Classification Search
CPC ..... B60C 27/14; B60C 27/145; B60C 27/045; B60B 39/12; B60B 39/00; B25B 27/22
USPC ................... 152/213 R, 214; 301/38.1, 41.1; 280/757; 188/4 B, 4 R, 5
See application file for complete search history.

(56) References Cited

U.S. PATENT DOCUMENTS

| | | | | |
|---|---|---|---|---|
| 4,657,118 A | * | 4/1987 | Andersson | B60B 39/003 152/208 |
| 4,800,939 A | * | 1/1989 | Torneback | B60B 39/006 152/214 |
| 5,080,443 A | * | 1/1992 | Torneback | B60B 39/003 188/4 B |
| 5,386,888 A | * | 2/1995 | Hofmann | B60B 39/006 188/4 B |
| 5,785,351 A | * | 7/1998 | Chang | B60B 39/006 152/208 |
| 6,409,215 B1 | * | 6/2002 | Holmgren | B60B 39/006 188/4 B |
| 6,651,783 B1 | * | 11/2003 | Atkinson, Jr. | B60C 27/045 188/4 B |

(Continued)

*Primary Examiner* — Jason Bellinger
(74) *Attorney, Agent, or Firm* — Angus C. Fox, III (57) ABSTRACT

A unit for rapid deployment and retraction of chain traction systems for vehicles includes a pneumatic cylinder having a cylindrical chamber enclosing a piston that is pneumatically-movable bidirectionally. A control rod coupled at one end to the piston passes through an end of the chamber and is coupled to a rack linearly movable within a sealed, grease-containing case. The rack is formed from a series of equally-spaced roller pins secured between parallel walls of a rack frame. The roller pins of the rack engage a sprocket affixed to a rotatable shaft to which is rigidly coupled an actuator arm of the rapidly-deployable vehicle ice and snow chain traction system. As the rack is moved back and forth, the actuator arm swings through an arc that—depending on the displacement of the control rod and the length of the rack, can be greater than 180 degrees.

12 Claims, 12 Drawing Sheets

(56) References Cited

U.S. PATENT DOCUMENTS

| | | | | |
|---|---|---|---|---|
| 6,830,134 B2* | 12/2004 | Choi | ............... | B60B 39/006 152/214 |
| 7,118,130 B2* | 10/2006 | Rosenbalm | ........... | B60B 39/003 180/16 |
| 7,506,729 B2* | 3/2009 | Smith | ................ | B60B 39/006 188/4 B |
| 7,963,560 B2* | 6/2011 | Holmgren | ............ | B60B 39/006 152/214 |
| 2009/0211679 A1* | 8/2009 | Rieger | ................ | B60B 39/006 152/214 |

* cited by examiner

PNEUMATICALLY-OPERATED RIGID LINEAR CHAIN AND SPROCKET ACTUATOR FOR DEPLOYING A VEHICLE SNOW CHAIN TRACTION SYSTEM

BACKGROUND OF THE INVENTION

Field of the Invention

This invention relates, generally, to vehicle ice and chain traction systems which may be both rapidly deployed and rapidly retracted. More particularly, it relates to an actuator apparatus in which a pneumatic cylinder linearly motivates a slidable rack comprised of equally-spaced, parallel roller pins mounted thereon. The roller pins engage a rotatable sprocket that is coupled to a chain traction system deployment arm.

Description of Related Art

Rapidly-deployable chain traction systems, which may be characterized generally as systems which fling short chain or cable segments beneath a road tire, have been known for some 90 years. Such a system is disclosed in U.S. Pat. No. 1,045,609 and in German Pat. No. 266,487 to W. H. Putnam for an ANTISKIDDING DEVICE. Throughout the years, various modifications and improvements have been made by numerous inventors. The following list is a representative list of a dozen other U.S. patents issued in this field:

- U.S. Pat. No. 1,150,148 for a TRACTION AND ANTI-SKIDDING DEVICE;
- U.S. Pat. No. 1,223,070 for an ANTISKIDDING DEVICE FOR VEHICLES;
- U.S. Pat. No. 1,374,252 for an ANTISKID DEVICE FOR AUTOMOBILES;
- U.S. Pat. No. 1,381,001 for a NON-SKID DEVICE FOR MOTOR AND OTHER VEHICLES;
- U.S. Pat. No. 1,975,325 for an ANTISKID CHAIN AND MEANS FOR APPLYING AND REMOVING SAME;
- U.S. Pat. No. 2,241,923 for an AUTOMATIC EMERGENCY TRACTION DEVICE FOR AUTOMOBILES;
- U.S. Pat. No. 2,264,466 for an ANTISKID DEVICE FOR VEHICLES;
- U.S. Pat. No. 2,277,036 for an ANTISKID DEVICE;
- U.S. Pat. No. 2,283,948 for an AUTOMOBILE TRACTION DEVICE;
- U.S. Pat. No. 2,442,322 for an ANTISKID DEVICE;
- U.S. Pat. No. 4,299,310 for an ANTISKID DEVICE FOR MOTOR VEHICLES;
- U.S. Pat. No. 4,800,992 for an ANTI-SKID DEVICE; and
- U.S. Pat. No. Des. 286,524 for ANTI SKID CHAIN UNIT FOR VEHICLE TIRES.

Figure 1:
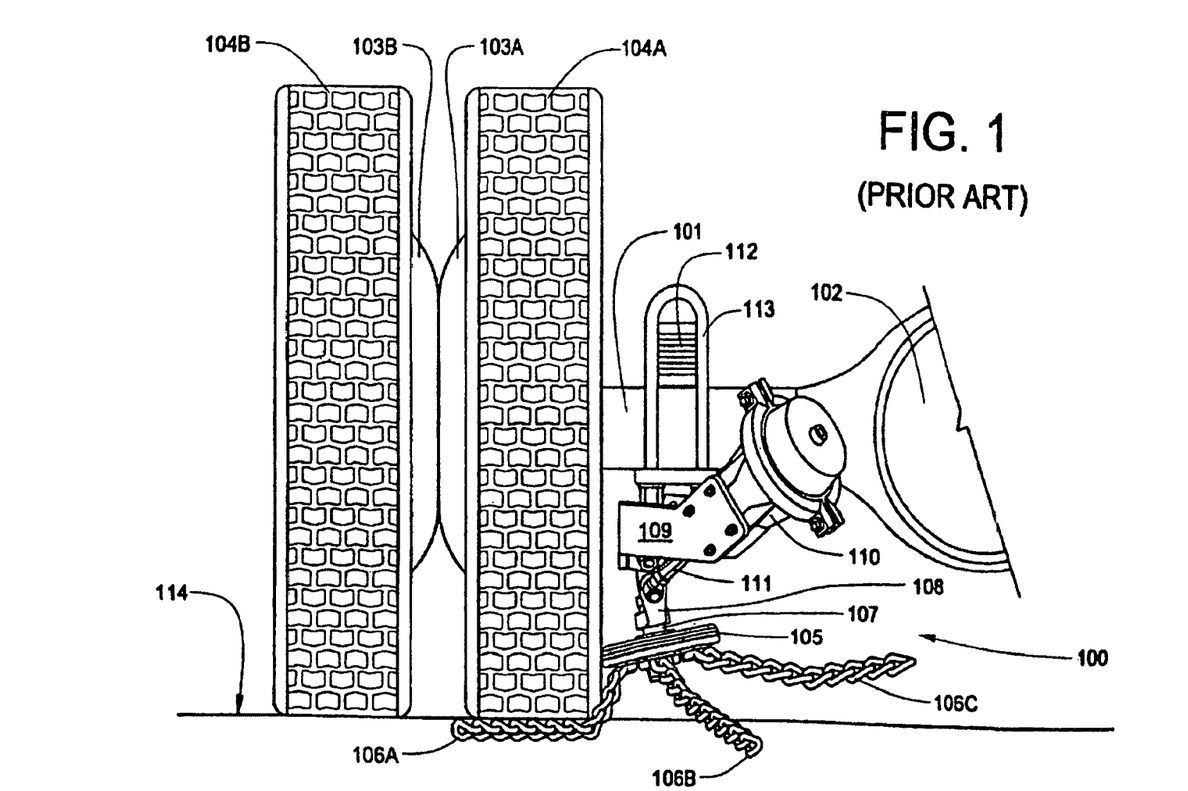
FIG. 1 is a rear elevational view of a typical modern prior-art rapidly-deployable chain traction system.

Referring now to the prior-art system of FIG. 1, a modern rapidly-deployable chain traction system 100 is depicted in its deployed configuration in this rear elevational view drawing. The chain traction system 100 is removably affixed to a drive axle 101 which incorporates a differential unit 102. Inner and outer road wheels (103A and 103B, respectively) are mounted on the visible half of the drive axle 101. On each road wheel (103A and 103B) is mounted a rubber tire (104A and 104B, respectively). The chain system 100 includes a friction drive disc 105 to which a plurality of traction chain segments 106A, 106B and 106C (106, generally) are attached. Chain segment 106A is depicted as being below the road surface 114, which is normally covered with a layer of snow or ice when the chain system 100 is in the deployed configuration. The friction drive disc 105 is rotatably mounted on a spindle 107 which is affixed to a deployment arm 108 which is pivotally mounted to a main frame bracket 109. The main frame bracket 109 is, in turn, bolted to the U-bolt shackles 113 which secure the suspension leaf springs 112 to the drive axle 101. The chain system 100 also includes a pneumatic cylinder 110 that is bolted to the main frame bracket 109. The pneumatic cylinder 110 has an internal piston (not shown) that is coupled to a slidable rod 111 that is held in a normally retracted position within cylinder 110 by spring biasing when pressure within cylinder 108 equals ambient pressure. The outer end of slidable rod 111 is connected to deployment arm 108. In the deployed configuration, the outer rim of friction drive disc 105 is pressed against the sidewall of tire 104A by a biasing force applied to deployment arm 108 by slidable rod 111. The biasing force is provided by pneumatic pressure inside pneumatic cylinder 110 which overcomes the spring biasing and causes slidable rod 111 to extend. As the tire 104A rotates, the friction drive disc 105 also rotates with the chain segments 106 extended more or less radially therefrom. Thus each chain segment 106 is flung, sequentially, beneath the tread portion of tire 104A. In order to retract the system and disengage the friction drive disc 105 from contact with the sidewall of tire 104A, pneumatic pressure to pneumatic cylinder 110 is cut off, causing slidable rod 111 to retract within cylinder 110 and raising the deployment arm 108, the rotatably attached friction drive disc 105 and the attached chain segments 106. In the retracted configuration, the chain segments 106 do not touch the road surface 114.

Figure 2:
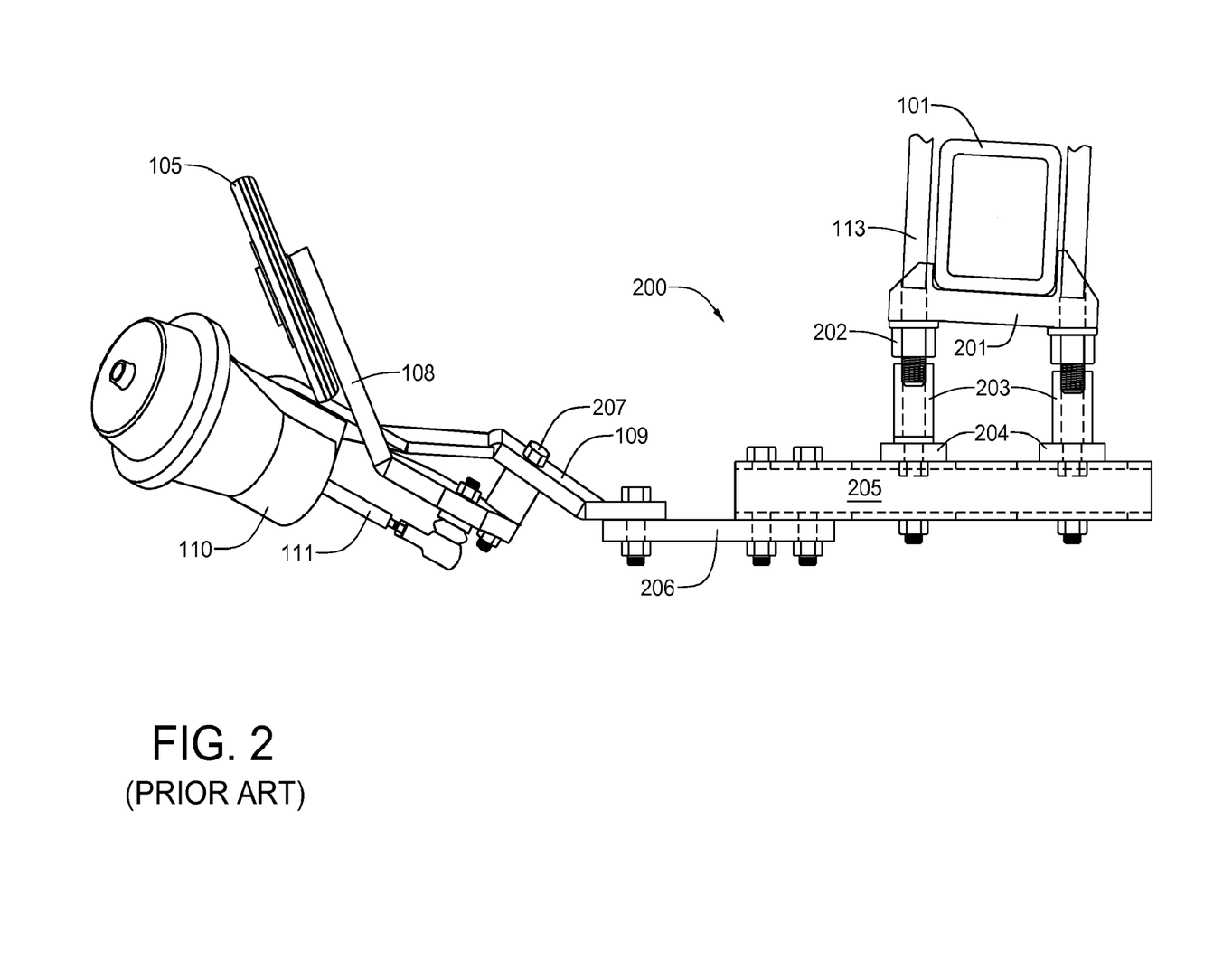
FIG. 2 is a side elevational view of a typical modern prior-art rapidly-deployable chain traction system.

Referring now to FIG. 2, mounting of the rapidly-deployable chain traction system 100 of FIG. 1 to the axle 101 is shown in detail. For the sake of simplicity, the traction chain segments 106 have been removed from the friction drive disc 105. On each side of the vehicle, a chain traction system 100 is secured via a mounting assembly 200 to U-bolt shackles 113 which commonly secure the axle 101 to a set of leaf springs 112 (see FIG. 1). Each leaf spring set is coupled to the beam axle or axle housing (in the case of a live axle) with a pair of U-bolt shackles 113, which are tied together beneath the axle or axle housing with shackle plates 201 that are secured with four standard nuts 202 (two on each U-bolt). The mounting assembly 200 for each side of the vehicle includes four coupling nuts 203 which engage exposed threads on the U-bolt shackles 113, two tie plates 204, which tie together the pairs of U-bolt shackles 113, a tube 205 that is bolted to a center aperture in each tie plate 204, and a link plate 206 that is bolted to both the tube 205 and the main frame member 206 of the chain traction system 100.

Still referring to FIG. 2, it will be noted that slidable rod 111 of the pneumatic cylinder 110 operates directly on the deployment arm 108 of the chain traction system 100. The deployment arm 108 is pivotally secured with a pivot bolt 207 to the main frame bracket 109. As a consequence of direct action of the piston rod 111 on the deployment arm 108, arcuate motion of the deployment arm 108 is limited to about 150 degrees.

Although various mechanical means, such as cables and gears, have been used in the past to deploy chain traction systems, the current genre of chain traction systems relies almost exclusively on pneumatic cylinders for deployment. A major problem associated with chain traction systems deployed by pneumatic cylinders is that the arc of rotation of the support member 108, on which the spindle 107 and friction disc 105 are mounted, is limited to less than about 150 degrees. In addition, the system may be too bulky for certain applications, such as installation on light-duty pickup trucks. One major problem associated with prior art gear-driven deployment systems, on the other hand, is that uneven road surfaces imposed a potentially destructive shock load on the gear train when the chain traction system was in a retracted state. The shock loads had a tendency to shear the teeth off of gears in the deployment gear train. The shock loads could also fracture the housing used to contain the gear train. Another major problem associated with gear-driven deployment systems is that of grit, water, and corrosion related to inadequate protection of the gear train. For a gear-driven deployment system to function reliably, it is essential that all gears and all bearings be completely sealed from the harsh environment beneath the vehicle. Without proper sealing, the life expectancy of such systems would likely be no more than one winter season. Gear driven deployment systems for a chain traction system, if not manually operated, require some type of motor for automatic operation. For most vehicles, the only type of motor that makes sense is an electric motor, as electric power is readily available from the vehicle's storage battery.

U.S. Pat. No. 7,506,729, granted to Fred P. Smith and John H. Atkinson, Jr. on Mar. 24, 2009, titled TORQUE-LIMITED ELECTRIC SERVO SYSTEM FOR DEPLOYING A VEHICLE SNOW CHAIN TRACTION SYSTEM, was an attempt to provide an improved ice chain deployment system where the deployment arm was not limited to rotation through an arc no greater than about 150 degrees. The deployment system, which included a gearbox to which an electric drive motor was externally mounted, required at least one pair of deployment units: one each for right and left drive wheels. Each unit includes a reversible electric drive motor having an armature shaft; an intermediate drive shaft; a worm axially affixed to the intermediate drive shaft; an output shaft; a shock damper affixed to the output shaft; a worm gear affixed to the shock damper, the worm gear meshing with the worm, and providing rotational locking for said output shaft; and a deployment arm coupled to the output shaft, the deployment arm having rotatably mounted thereto a friction drive disc to which were peripherally attached a plurality of chain segments. Torque applied to the output shaft by the electric motor was limited either by a spring-loaded clutch axially mounted on the intermediate drive shaft or by a circuit which limits current drawn by the electric drive motor to a preset maximum. This innovative deployment system, which was initially marketed by the assignee of the present invention, experienced multiple problems, including circuit design problems, water leakage into the circuit components, and a propensity to deploy automatically, which was caused by vibration and shocks experienced by the vehicle on which it was mounted. Though some of the problems were eventually solved, the unit soon gained notoriety as a lemon in the industry, which doomed its acceptance in the marketplace.

What is needed is a new deployment system for a vehicle snow chain traction system that does not suffer from the deficiencies of the heretofore described prior art systems, that is reliable, compact, simple to install, and capable of providing rotational motion in excess of 180 degrees.

SUMMARY OF THE INVENTION

The present invention answers the needs expressed in the foregoing section. A new system is provided for rapid deployment and rapid retraction of vehicle ice and snow chain traction systems. The new system includes a pneumatic cylinder having a cylindrical chamber enclosing a piston that is pneumatically-movable bidirectionally. A control rod coupled at one end to the piston passes through an end of the chamber and is coupled to a rack that is linearly movable within a sealed, grease-containing case. The rack is formed from a series of equally-spaced roller pins which are secured between parallel walls of a rack frame. The roller pins of the rack engage a sprocket that is affixed to a rotatable shaft, which is rigidly coupled an actuator arm of the rapidly-deployable vehicle ice and snow chain traction system. The rotatable shaft turns in sealed ball bearing races mounted in bearing retainers that are bolted to the case. As the rack is moved back and forth, the actuator arm swings through an arc that—depending on the displacement of the control rod and the length of the rack, can be greater than 180 degrees. For a preferred embodiment of the invention, the piston is moved bidirectionally with compressed air. Position of the rack at limits of travel is maintained by air pressure applied to one side of the piston. Proper clearance between the sprocket and the rack is provided by tightening or loosening an play-adjustment bolt that secures one end of a rocking idler bar that is equipped with an end roller at the opposite end that minimizes friction between the idler bar and the rack.

PREFERRED EMBODIMENT OF THE INVENTION

The pneumatically-operated rigid linear chain and sprocket actuator for rapidly deploying and retracting a vehicle snow chain traction system will now be described in detail with reference to the attached drawing figures.

Figure 3:
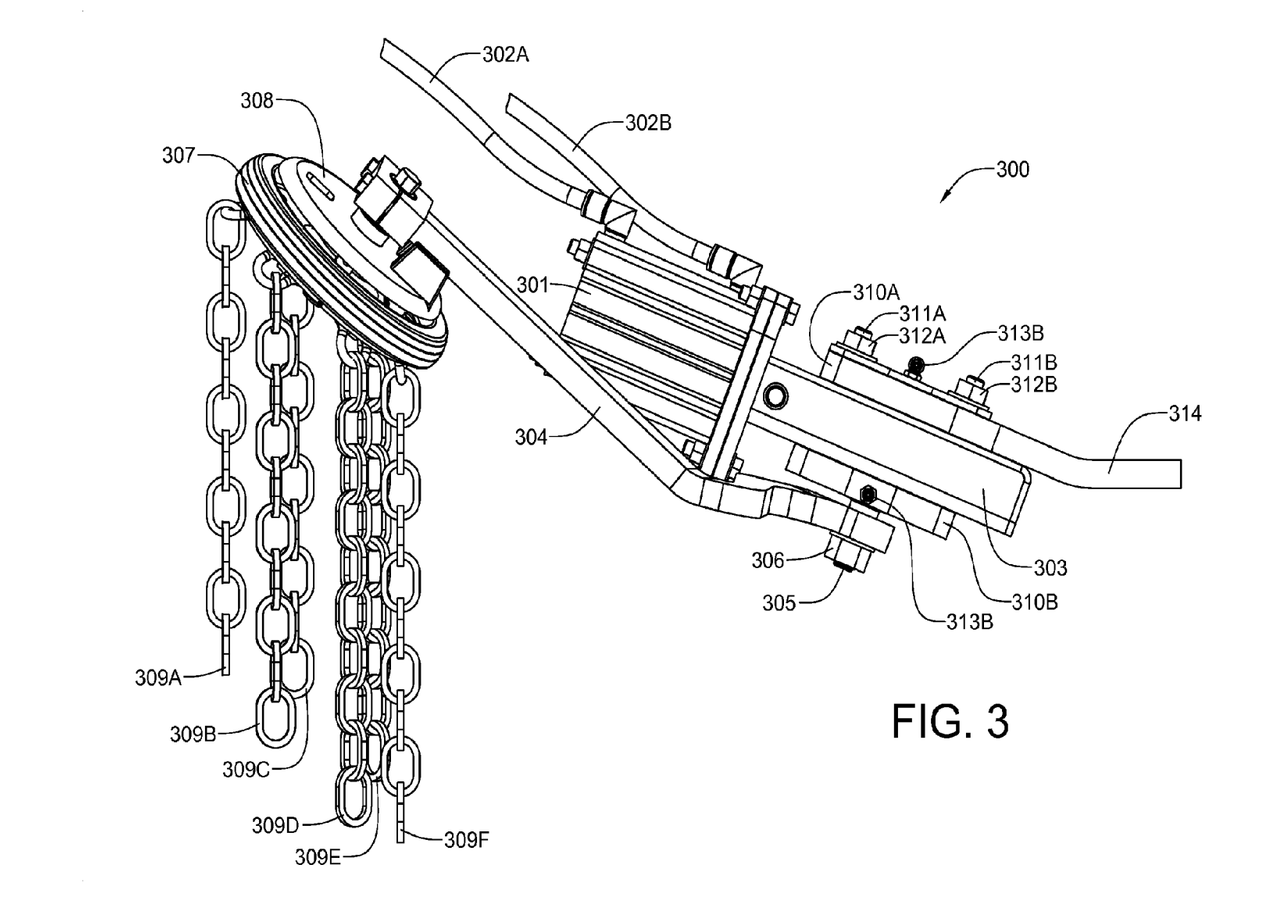
FIG. 3 is an elevational right-side view of the new linear actuator unit, a rotatably-coupled deployment arm having a traction-chain-equipped friction disc rotatably secured to a free end thereof, and a pneumatic cylinder assembly bolted to the linear actuator unit.

Referring now to FIG. 3, the new vehicle snow chain traction system 300 includes a pneumatic cylinder assembly 301 having a cylindrical chamber enclosing a piston (internal components of the pneumatic cylinder assembly are not shown in this view) that is pneumatically-movable bidirectionally by means of compressed air delivered by compressed air lines 302A and 302B. The pneumatic cylinder assembly 301 is bolted to a rigid linear chain and sprocket actuator unit 303. An actuator shaft 304, on which the internal sprocket (now shown in this view) is secured, protrudes through one side of the actuator unit 303. A deployment arm 304 is rigidly secured to the protruding end of the actuator shaft 305 with a lock nut 306. For a preferred embodiment of the invention, the actuator shaft has a tapered square end that engages a tapered square aperture in the deployment arm 304. A friction disc 307 is rotatably affixed to a free end of the deployment arm 304. A non-rotating cover plate 308 covers one side of the rotatable friction disc 307. Multiple chain segments 309A, 309B, 309C, 309D, 309E and 309F are secured to the friction disc 307. It will be noted that the actuator shaft 305 is secured between first and second bearing retainer plates 310A and 310B, respectively, which are bolted together with bolts 311A and 311B and nuts 312A and 312B. Each of the bearing retainer plates 310A and 310B is equipped with a grease fitting 313A and 313B, respectively. It will be noted that the first bearing retainer plate 310A has an extended portion 314 that functions as a mounting bracket. Oil-impregnated, sintered bronze bushings can be used in this application, as can tapered roller bearings. All internal bearing components are sealed from the harsh exterior environment with resilient polymeric seals.

Figure 4:
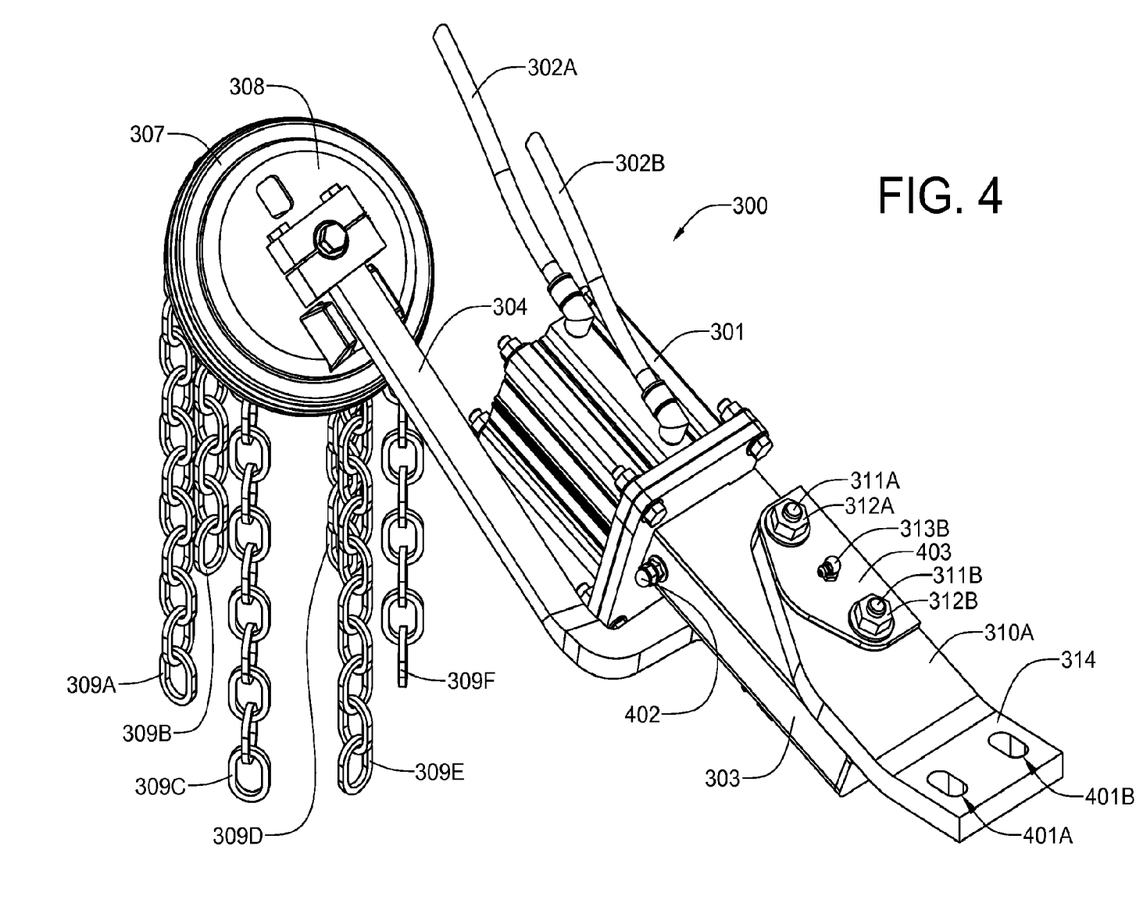
FIG. 4 is an isometric right-side/top view of the new linear actuator unit, a rotatably-coupled deployment arm having a traction-chain-equipped friction disc rotatably secured to a free end thereof, and a pneumatic cylinder assembly bolted to the linear actuator unit.

Referring now to FIG. 4, additional details of the first bearing retainer plate 310A are visible in this view. Two elongated bolt holes 401A and 401B provide angular adjustment when the deployment system is attached to the vehicle frame. A play-adjustment bolt 402, that adjusts play between the internal roller-pin rack and the sprocket.

Figure 5:
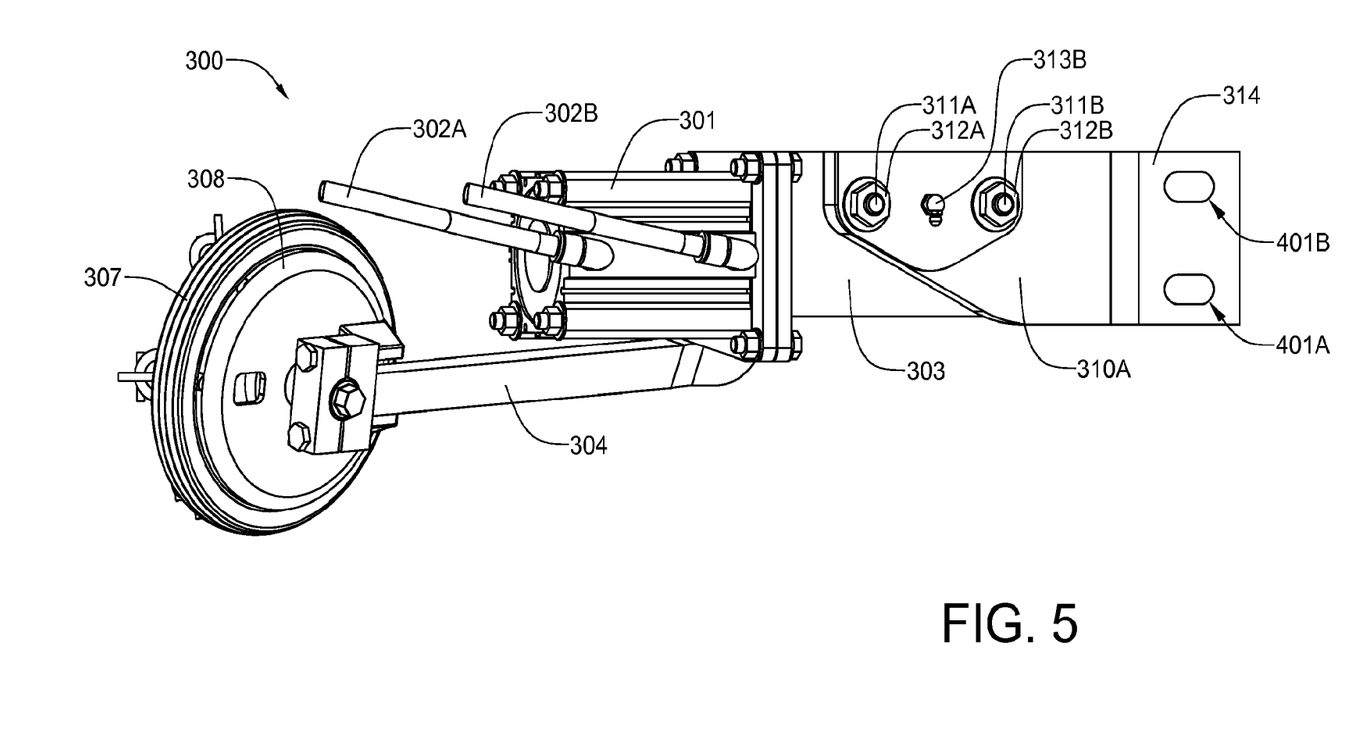
FIG. 5 is an isometric top view of the new linear actuator unit, a rotatably-coupled deployment arm having a friction disc—with the traction chain segments removed—rotatably secured to a free end thereof, and a pneumatic cylinder assembly bolted to the linear actuator unit.
Figure 6:
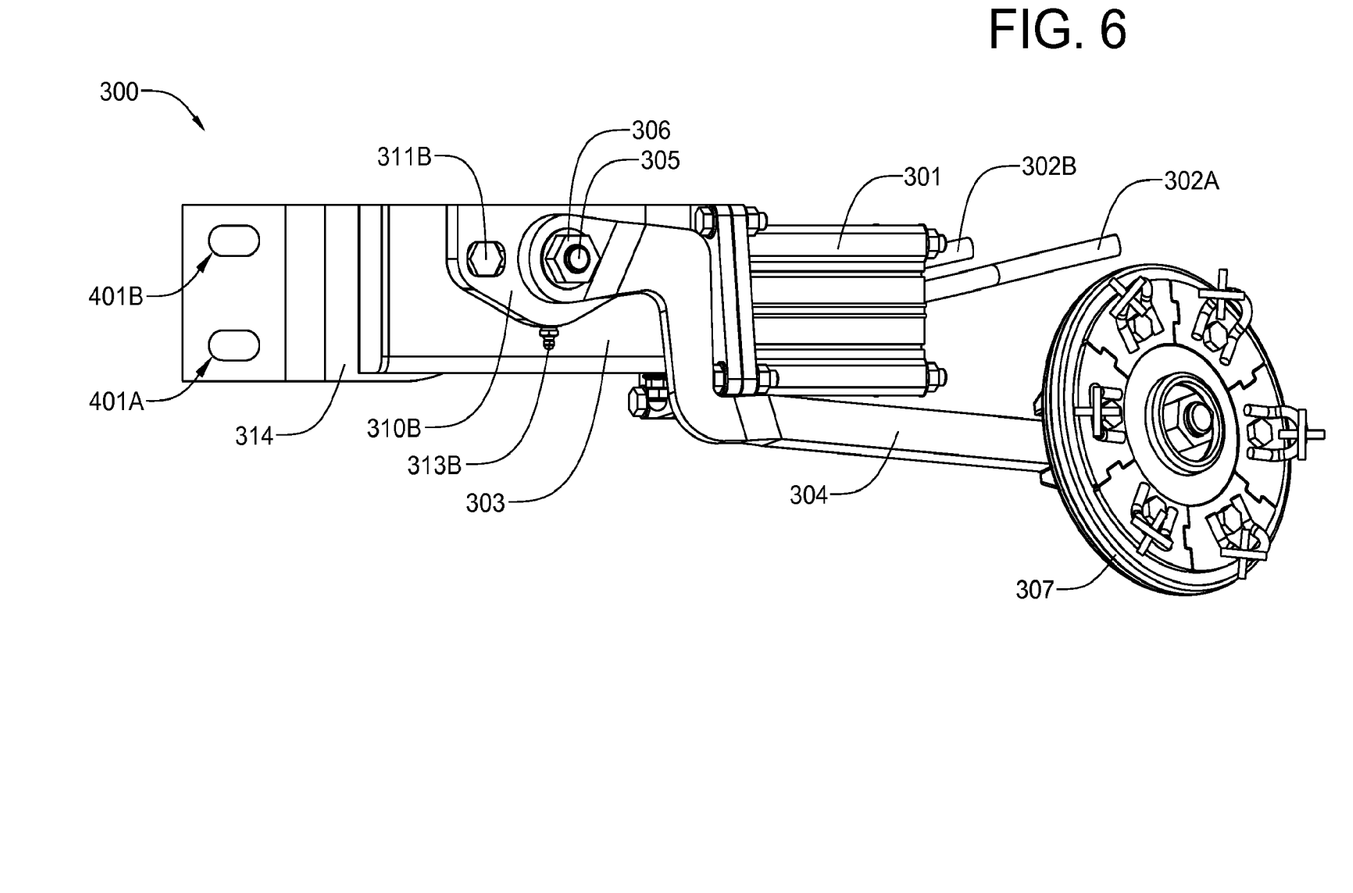
FIG. 6 is an isometric bottom view of the new linear actuator unit, a rotatably-coupled deployment arm having a friction disc—with the traction chain segments removed—rotatably secured to a free end thereof, and a pneumatic cylinder assembly bolted to the linear actuator unit.
Figure 7:
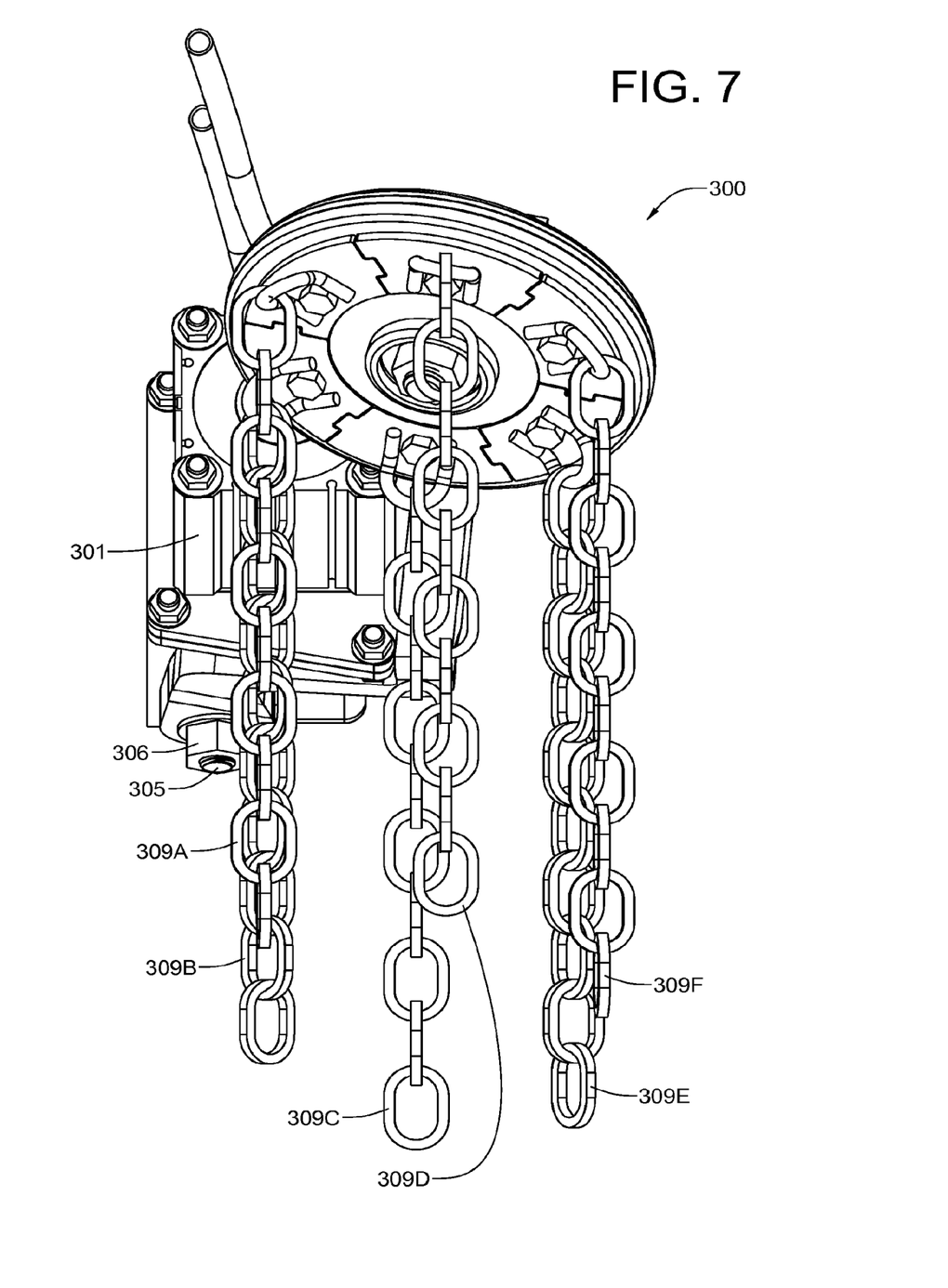
FIG. 7 is an isometric rear/bottom view of the new linear actuator unit, a rotatably-coupled deployment arm having a traction-chain-equipped friction disc rotatably secured to a free end thereof, and a pneumatic cylinder assembly bolted to the linear actuator unit.

Referring now to FIGS. 5, 6 and 7, the new vehicle snow chain traction system 300 is shown from various angles. In FIGS. 6 and 7, details of the chain-attachment side of the friction disc 307 are visible.

Figure 8:
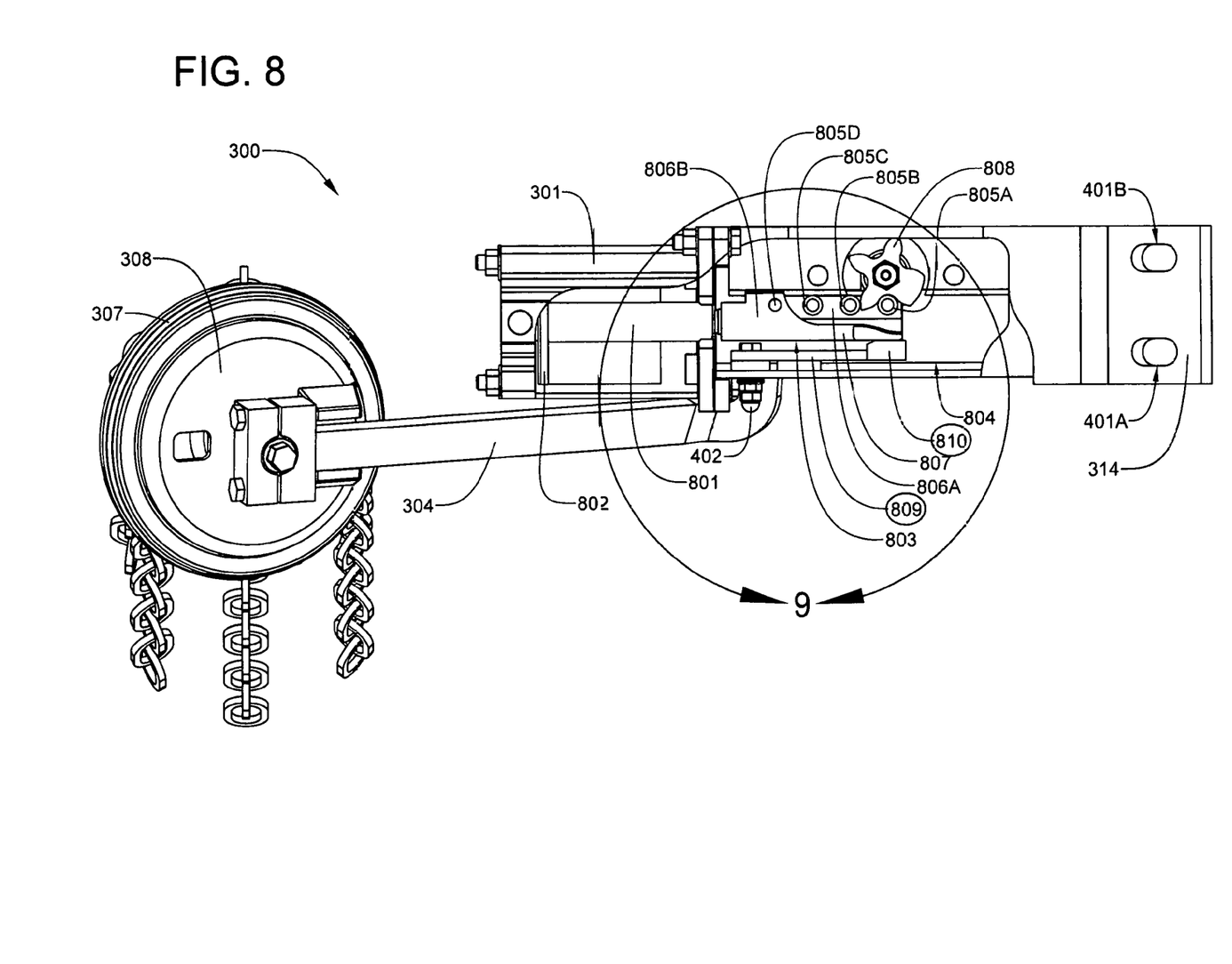
FIG. 8 is a cut-away top plan view of the new linear actuator unit, a rotatably-coupled deployment arm having a traction-chain-equipped friction disc rotatably secured to a free end thereof, and a pneumatic cylinder assembly bolted to the linear actuator unit.
Figure 9:
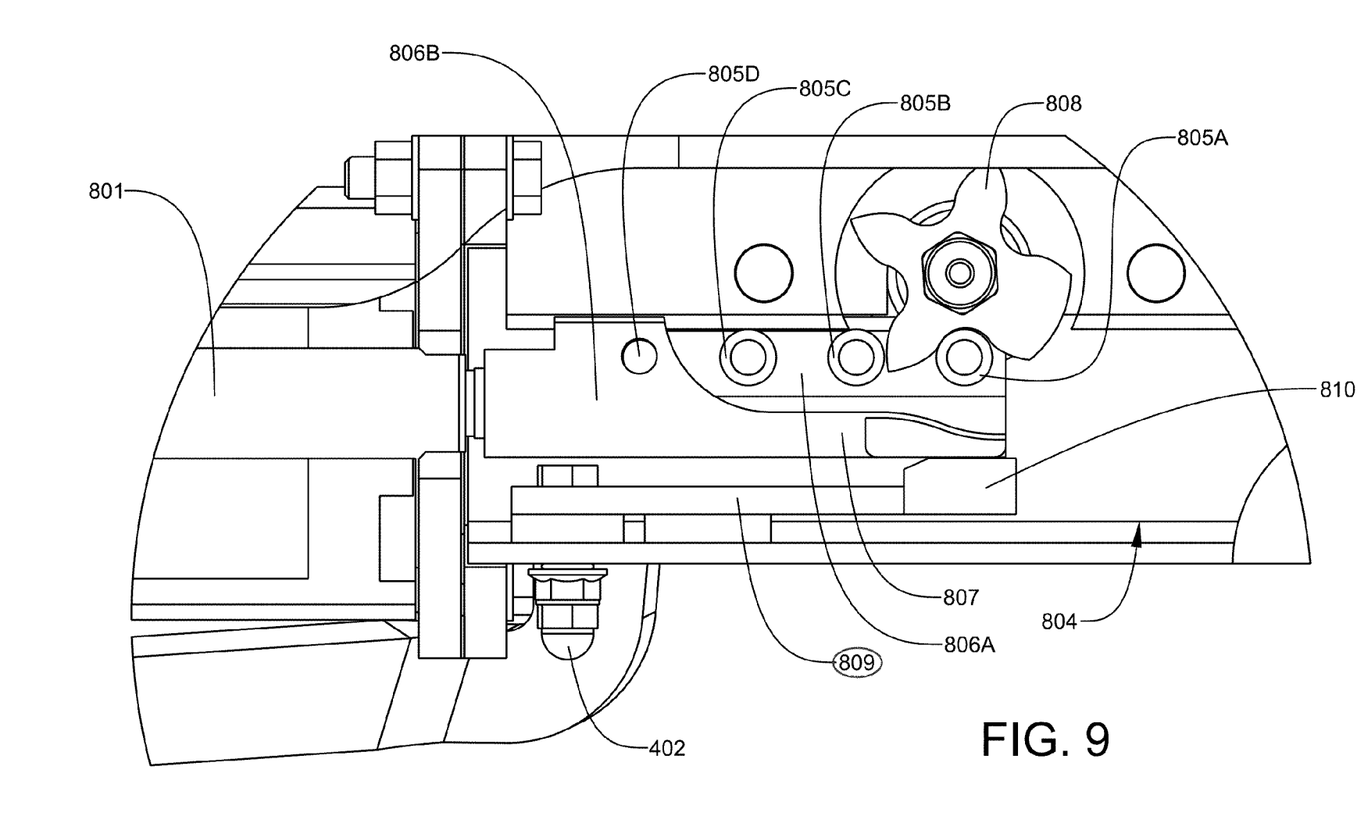
FIG. 9 is an enlarged top plan view of circular area 9 of FIG. 8.
Figure 10:
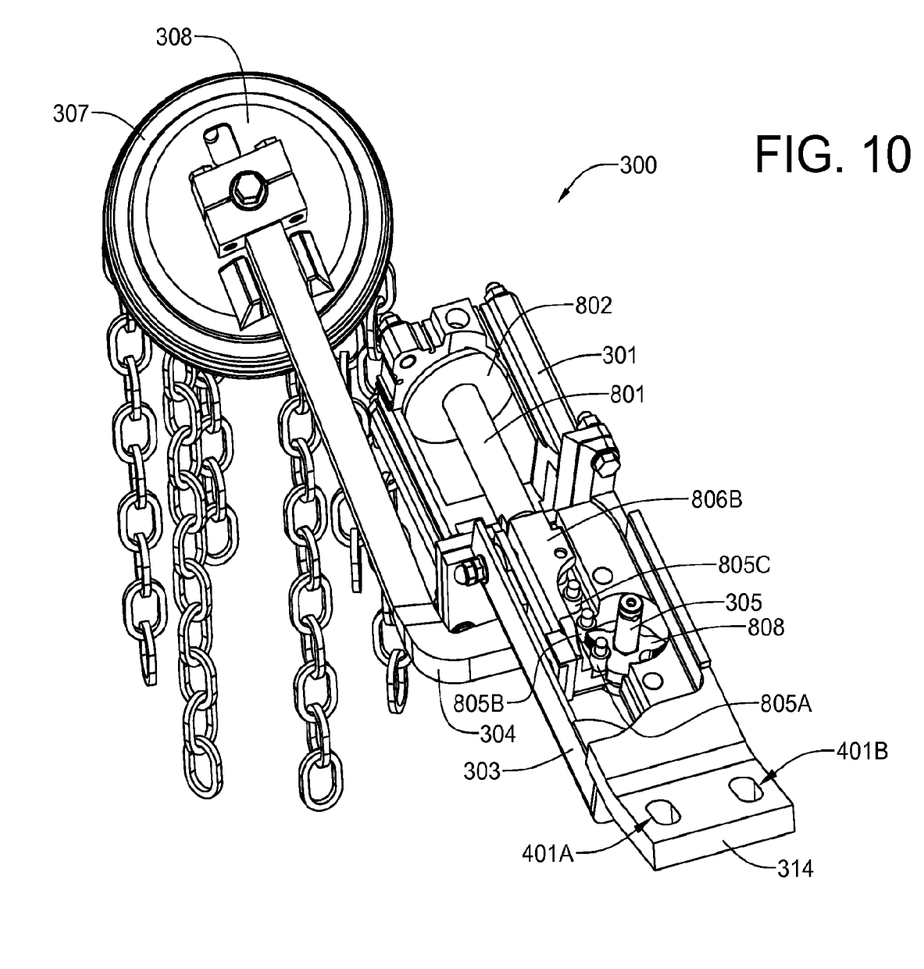
FIG. 10 is a cut-away isometric view of the new linear actuator unit, a rotatably-coupled deployment arm having a traction-chain-equipped friction disc rotatably secured to a free end thereof, and a pneumatic cylinder assembly bolted to the linear actuator unit.

Referring now to FIGS. 8, 9 and 10, cut-way views of the new vehicle snow chain traction system 300 show interior mechanical details of the device. The pneumatic cylinder assembly 301 is bolted to a rigid linear chain and sprocket actuator unit 303. The pneumatic cylinder assembly 301 and the actuator unit 303 have aligned openings at their adjoining ends. A control rod 801, which is rigidly coupled to the piston 802 of the pneumatic cylinder assembly 301, is rigidly coupled to a rack 803 that is linearly movable within a sealed, grease-containing chamber 804. The rack 803 is formed from a series of equally-spaced roller pins 805A, 805B, 805C and 805D which are secured between parallel walls 806A and 806B which extend from a rack backbone 807 (roller pin 805D is hidden behind wall 806B). The roller pins 805A-805D engage a sprocket 808 that is affixed to the rotatable actuator shaft 305, to which the deployment arm 304 is rigidly secured. It will be noted that the sprocket has three teeth with identical profiles and a stop portion that is much wider than a tooth. The stop portion is designed to withstand vibrational loads at the end of the rack stroke. Rotatability of the roller pins 805A-805D minimizes friction and wear on the sprocket teeth and the outer surfaces of the roller pins. As the rack 803 is moved back and forth, the deployment arm 304 swings through an arc that—depending on the displacement of the control rod and the length of the rack, can be greater than 180 degrees. A tensioning bar 809 is equipped with a low-friction pad 810 that rides against the underside of the backbone 807. The play-adjustment bolt 402 tightens the tensioning bar 809 against the inside of the chamber 804.

Figure 11:
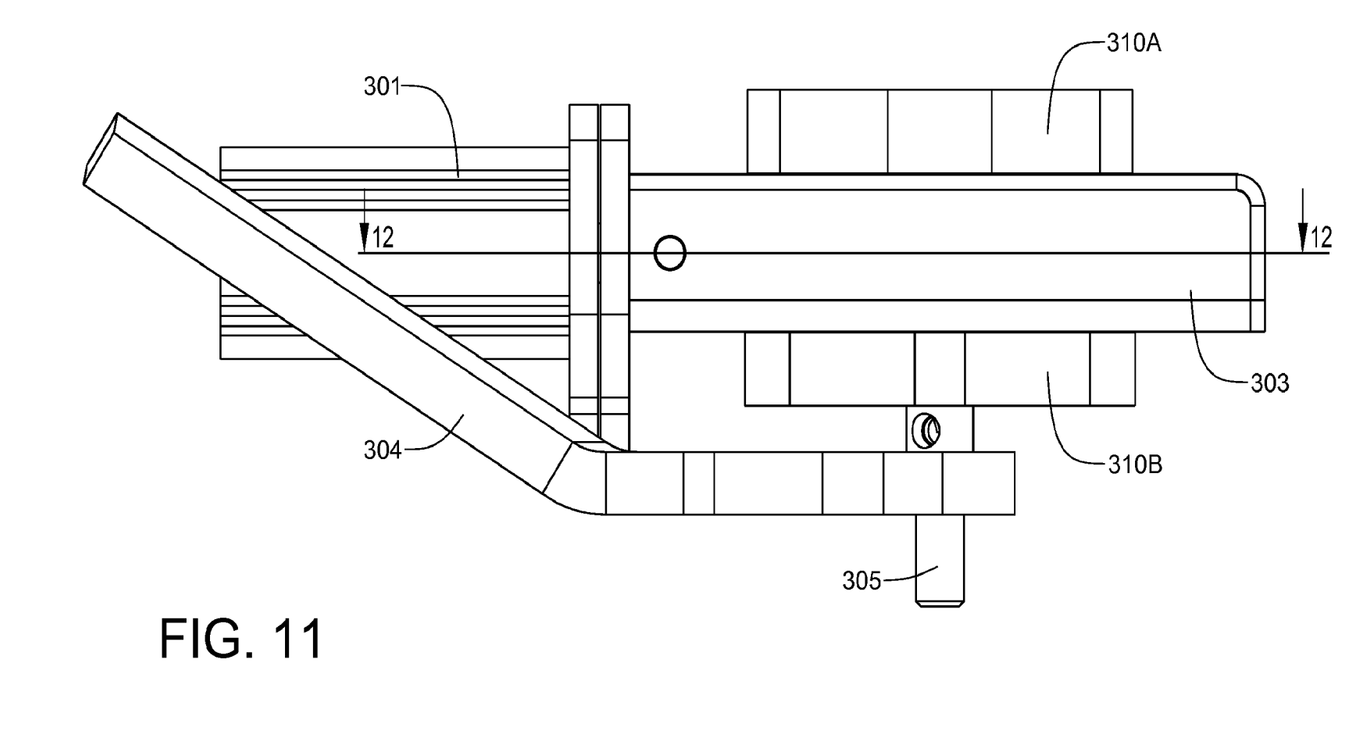
FIG. 11 is a side elevational view of the linear actuator unit and a front portion of the pneumatic cylinder assembly, which contains the movable control rod.
Figure 12:
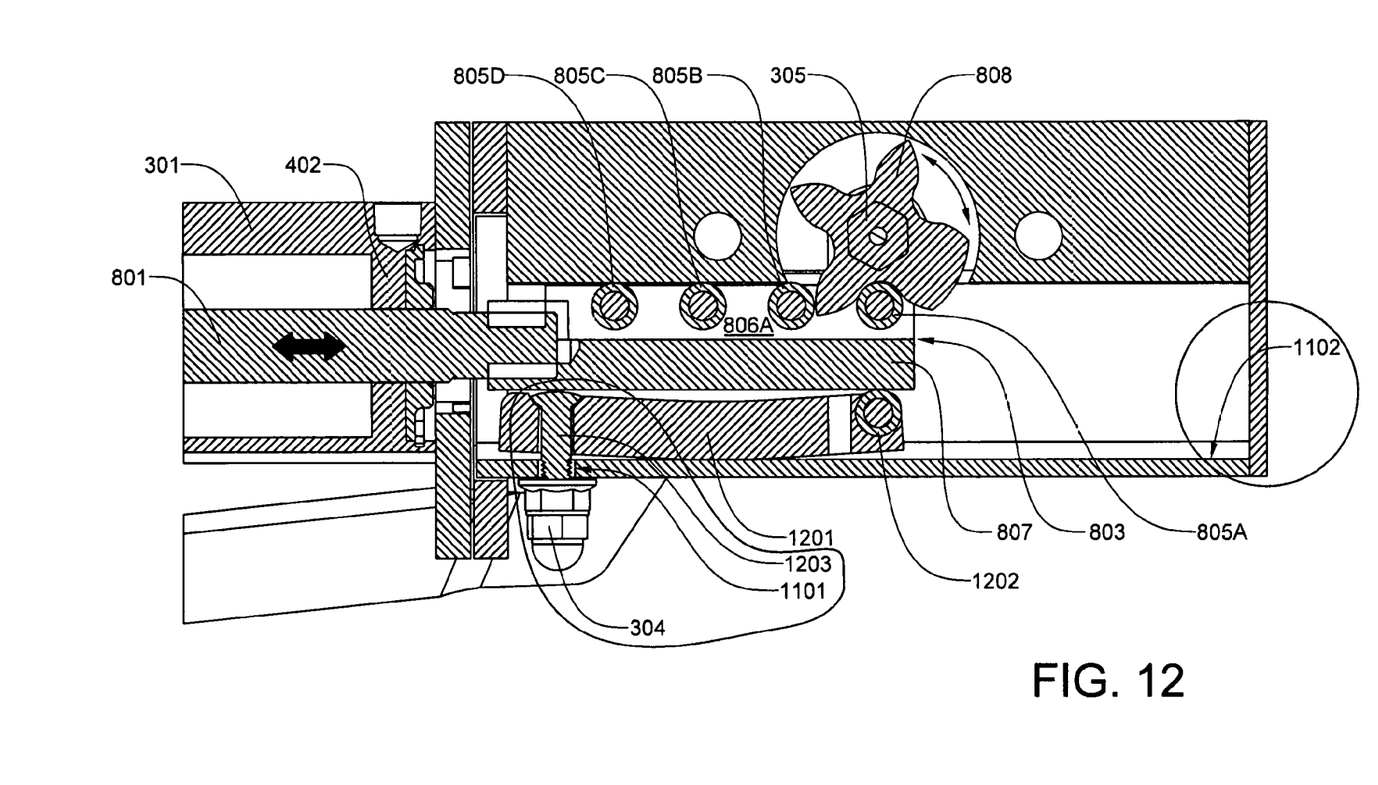
FIG. 12 is a cross-sectional view of the assembly of FIG. 11, taken through section line 12-12 thereof.

Referring now to FIG. 11, this bottom view shows a section plane 12-12 that applies for the cross-sectional view of FIG. 12. In this view, an aperture 1101 in the case 1102 of actuator unit 303 enables the play-adjustment bolt 402 to access to the tensioning bar 809 within the internal chamber 804 of the actuator unit case 1102.

Referring now to FIG. 12, a slightly different embodiment of the tensioning bar 809 is shown in this cross sectional view. A curved tensioning bar 1201 is equipped with a roller 1202 that rides against the underside of the backbone 807. The play-adjustment bolt 1203, which passes through aperture 1101 tightens the curved tensioning bar 1201 against the inside of the case 1102.

Though only a single embodiment of the invention has been disclosed and described herein, it will be obvious to those of ordinary skill in the art that modifications and changes may be made thereto without departing from the spirit and scope of the invention as hereinafter claimed. For example, the pneumatic cylinder can be replaced by a hydraulic cylinder.

The invention claimed is:

1. A pneumatically-operated actuator for deployment and retraction of a vehicle chain traction system comprising:
    a pneumatic cylinder having a cylindrical chamber enclosing a piston that is pneumatically-movable bidirectionally;
    a sealed, lubricant-containing case rigidly affixed to the pneumatic cylinder;
    a rack formed from a series of equally-spaced roller pins secured between parallel walls of a rack frame, said rack installed within said sealed case and linearly slidable therein;
    a sprocket having a plurality of teeth that engages the equally-spaced roller pins of the rack, said sprocket being installed in the sealed case and rigidly affixed to a rotatable shaft that extends through a sealed aperture outside the sealed case;
    an actuator arm having a first end rigidly affixed to an end of the rotatable shaft, and a second end having a friction disc rotatably affixed thereto, said friction disc being equipped with a plurality of snow and ice chain segments; and
    a control rod having one end coupled to the piston, and a second end coupled to the rack, whereby as the rack is moved back and forth by action of the pneumatic cylinder, the actuator arm swings through an arc that moves the friction disc against a wheel of a vehicle on which the chain traction system is mounted.

2. The pneumatically-operated actuator of claim 1, wherein the arc through which the actuator arm swings is greater than 180 degrees.

3. The pneumatically-operated actuator of claim 1, wherein the actuator and vehicle chain traction system are mounted on an axle of the vehicle on which the system is installed.

4. The pneumatically-operated actuator of claim 1, wherein rotatability of the roller pins minimizes friction and wear on the sprocket teeth and the outer surfaces of the roller pins.

5. The pneumatically-operated actuator of claim 1, wherein the sprocket has three teeth having identical profiles and equal radial spacing.

6. The pneumatically-operated actuator of claim 5, where the sprocket is equipped with a stop portion that is stronger that any of the three teeth and designed to withstand vibrational loads at fore and aft limits of rack movement.

7. An actuator for deployment and retraction of a vehicle chain traction system comprising:
- a cylinder having a cylindrical chamber enclosing a piston that is movable bidirectionally by forces applied to either side of the piston;
- a sealed, lubricant-containing case rigidly affixed to the pneumatic cylinder;
- a rack formed from a series of equally-spaced roller pins secured between parallel walls of a rack frame, said rack installed within said sealed case and linearly slidable therein;
- a sprocket having a plurality of teeth that engages the equally-spaced roller pins of the rack, said sprocket being installed in the sealed case and rigidly affixed to a rotatable shaft that extends outside the sealed case;
- an actuator arm having a first end rigidly affixed to an end of the rotatable shaft, and a second end having a friction disc rotatably affixed thereto, said friction disc being equipped with a plurality of snow and ice chain segments; and
- a control rod having one end coupled to the piston, and a second end coupled to the rack, whereby as the rack is moved back and forth by action of the pneumatic cylinder, the actuator arm swings through an arc that moves the friction disc against a wheel of a vehicle on which the chain traction system is mounted.

8. The actuator of claim 7, wherein the arc through which the actuator arm swings is greater than 180 degrees.

9. The actuator of claim 7, wherein the actuator and vehicle chain traction system are mounted on an axle of the vehicle on which the system is installed.

10. The actuator of claim 7, wherein rotatability of the roller pins minimizes friction and wear on the sprocket teeth and the outer surfaces of the roller pins.

11. The actuator of claim 7, wherein the sprocket has three teeth having identical profiles and equal radial spacing.

12. The actuator of claim 11, where the sprocket is equipped with a stop portion that is stronger that any of the three teeth and designed to withstand vibrational loads at fore and aft limits of rack movement.

* * * * *